United States Patent [19]

Taue et al.

[11] Patent Number: 4,969,442
[45] Date of Patent: Nov. 13, 1990

[54] HIGH PRESSURE FUEL INJECTION DEVICE FOR ENGINE

[75] Inventors: Jun Taue; Takeo Yoshida, both of Iwata, Japan

[73] Assignee: Yamaha Hatsudoki Kabushiki Kaisha, Iwata, Japan

[21] Appl. No.: 327,811

[22] Filed: Mar. 23, 1989

[30] Foreign Application Priority Data

Mar. 25, 1988 [JP] Japan .................................. 63-69749

[51] Int. Cl.⁵ ............................................. F02M 39/00
[52] U.S. Cl. ..................................... 123/447; 123/467
[58] Field of Search ............... 123/447, 502, 501, 446, 123/500, 467, 506, 494–499

[56] References Cited

U.S. PATENT DOCUMENTS

| 3,187,733 | 6/1965 | Heintz | 123/447 |
| 3,416,506 | 12/1968 | Steiger | 123/447 |
| 4,156,560 | 5/1979 | Cheklich . | |
| 4,674,448 | 6/1987 | Steiger | 123/447 |
| 4,711,216 | 12/1987 | Takeuchi | 123/447 |
| 4,712,528 | 12/1987 | Schaffitz | 123/447 |
| 4,784,101 | 11/1988 | Iwanaga | 123/467 |
| 4,838,231 | 6/1989 | Ganser | 123/467 |

FOREIGN PATENT DOCUMENTS

| 3227742 | 5/1983 | Fed. Rep. of Germany . | |
| 3712310 | 10/1987 | Fed. Rep. of Germany | 123/502 |
| 2117846 | 10/1983 | United Kingdom . | |
| 2185530 | 7/1987 | United Kingdom . | |

Primary Examiner—Carl S. Miles
Attorney, Agent, or Firm—Ernest A. Beutler

[57] ABSTRACT

A high pressure fuel injection device including an accumulator type fuel injection nozzle for an internal combustion engine. High pressure fluid is delivered to the accumulator chamber by a reciprocating pump and the amount of fuel discharged is controlled by controlling the discharge pressure of the high pressure pump. This is done by varying the timing phasing of the pump.

5 Claims, 4 Drawing Sheets

HIGH PRESSURE FUEL INJECTION DEVICE FOR ENGINE

BACKGROUND OF THE INVENTION

This invention relates to a high pressure fuel injection device for an engine and more particularly to an improved high pressure fuel injection device that controls the amount of fuel injected to the engine in response to all running conditions of the engine.

There is a known and popular type of fuel injection system that includes an injector nozzle of the type called the "accumulator type". This type of injection nozzle includes an accumulator chamber that has a nozzle port that is adapted to communicate the accumulator chamber with the combustion chamber of the engine. An injection valve controls the opening and closing of the nozzle port and is operated by means of an actuator device that is supported within a control chamber. Fuel is delivered under pressure to both the accumulator chamber and that control chamber and when both chambers are at the same pressure, the injection valve will be held in its closed position. In order to permit the injection of fuel, a relief valve that controls the pressure in the control chamber is open so as to permit the pressure in the control chamber to be relieved. When this happens, the fuel pressure in the accumulator chamber causes opening of the injection valve and fuel is injected into the engine.

This type of system is extremely effective and is very popular. However, the relief valve is normally operated by means of an electromagnet and the timing of the opening of the relief valve and the duration of its opening is related to the crankshaft or engine output shaft angle of the engine. Normally, the valve is held open for a fixed duration of the angular rotation of the crankshaft. As a result, when the engine is turning at a higher engine speed, the actual opening time of the relief valve and accordingly the discharge time of the nozzle will be less than when operating at low speeds. As a result, if the fuel delivery is designed so as to be adequate at high speed, the engine will tend to run over rich at low speeds. Alternatively, if the engine is operated at the desirable fuel/air mixture at low engine speeds, it will tend to run lean at high engine speeds.

It is, therefore, a principal object of this invention to provide an improved fuel injection system embodying an accumulator type fuel injection nozzle.

It is a further object of this invention to provide an improved accumulator type nozzle fuel injection system wherein the amount of fuel discharged under all running conditions may be maintained at the desirable amount.

It is a further object of this invention to provide an extremely simple and yet effective method for controlling the amount of fuel discharged by an accumulator type injection nozzle under all running conditions.

SUMMARY OF THE INVENTION

This invention is adapted to be embodied in a fuel injection system employing an accumulator type fuel injection nozzle. The fuel injection nozzle includes an accumulator chamber that can communicate with the combustion chamber through a nozzle port. An injection valve is supported in the accumulator chamber and controls the opening and closing of the nozzle port. There is further provided a control chamber in which an actuator element is supported and which actuator element operates to hold the injection valve in one of its positions when the control chamber and the accumulator chamber are at the same pressure. Fuel is delivered under pressure to both the accumulator chamber and the control chamber. There is provided a relief valve which can be sequentially opened to relieve the pressure in the control chamber and effect opening of the injection valve and to effect fuel injection. In accordance with the invention, means are provided for adjusting the pressure at which the fuel is supplied to the accumulator chamber and the control chamber in response to engine running characteristics.

DETAILED DESCRIPTION OF THE PREFERRED EMBODIMENT OF THE INVENTION

Figure 1:
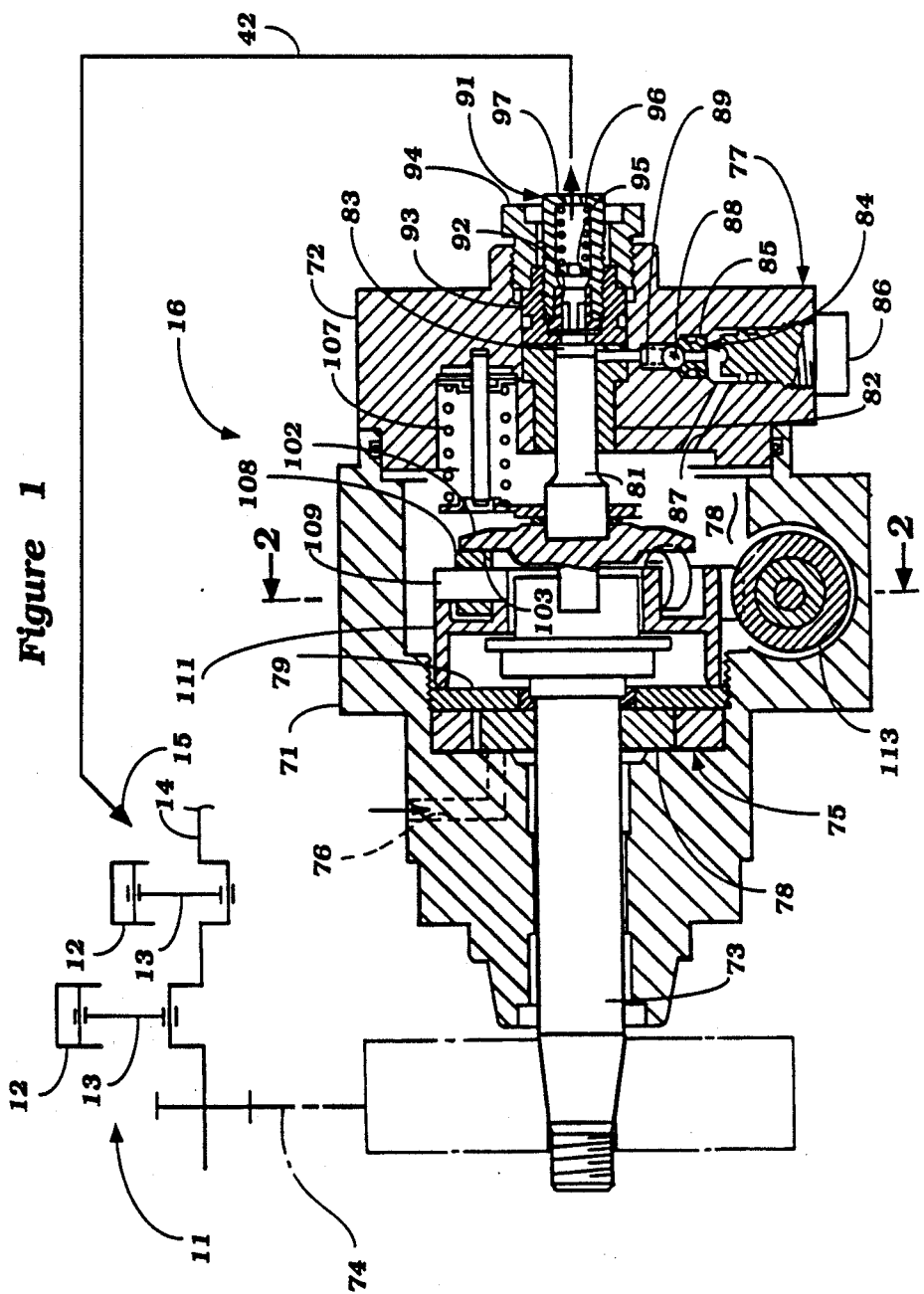
FIG. 1 is a view showing an internal combustion engine having a fuel injection system constructed in accordance with an embodiment of the invention, with the main high pressure injection pump being shown in cross-section and certain of the remaining components being shown schematically.

Referring first in detail to FIG. 1, an internal combustion engine having a fuel injection system constructed in accordance with an embodiment of the invention is shown partially in schematic fashion and is identified generally by the reference numeral 11. The engine 11 is, in the illustrated embodiment, depicted as being of the two cylinder in-line type. It is to be understood, however, that the invention can be employed with a wide variety of engine types. The engine 11 is comprised of a pair of cylinders 12 that are reciprocally supported in cylinder bores (not shown) and which are connected by means of connecting rods 13 to a crankshaft 14 for driving the crankshaft 14 in a known manner.

In accordance with the invention, the engine 11 is provided with a high pressure fuel injection system that includes an injection nozzle 15 for each cylinder. Only one such injection nozzle is shown in FIG. 1 and the construction of the injection nozzle is shown in more detail in FIG. 3. Fuel is supplied to the injection nozzle 15 from a high pressure pump, indicated generally by the reference numeral 16. As may be seen in the schematic portion of FIG. 3, the injection pump 16 draws fuel from a fuel reservoir 17 for delivery through an appropriate conduit to the injection nozzles 15 for delivery to the engine.

Figure 3:
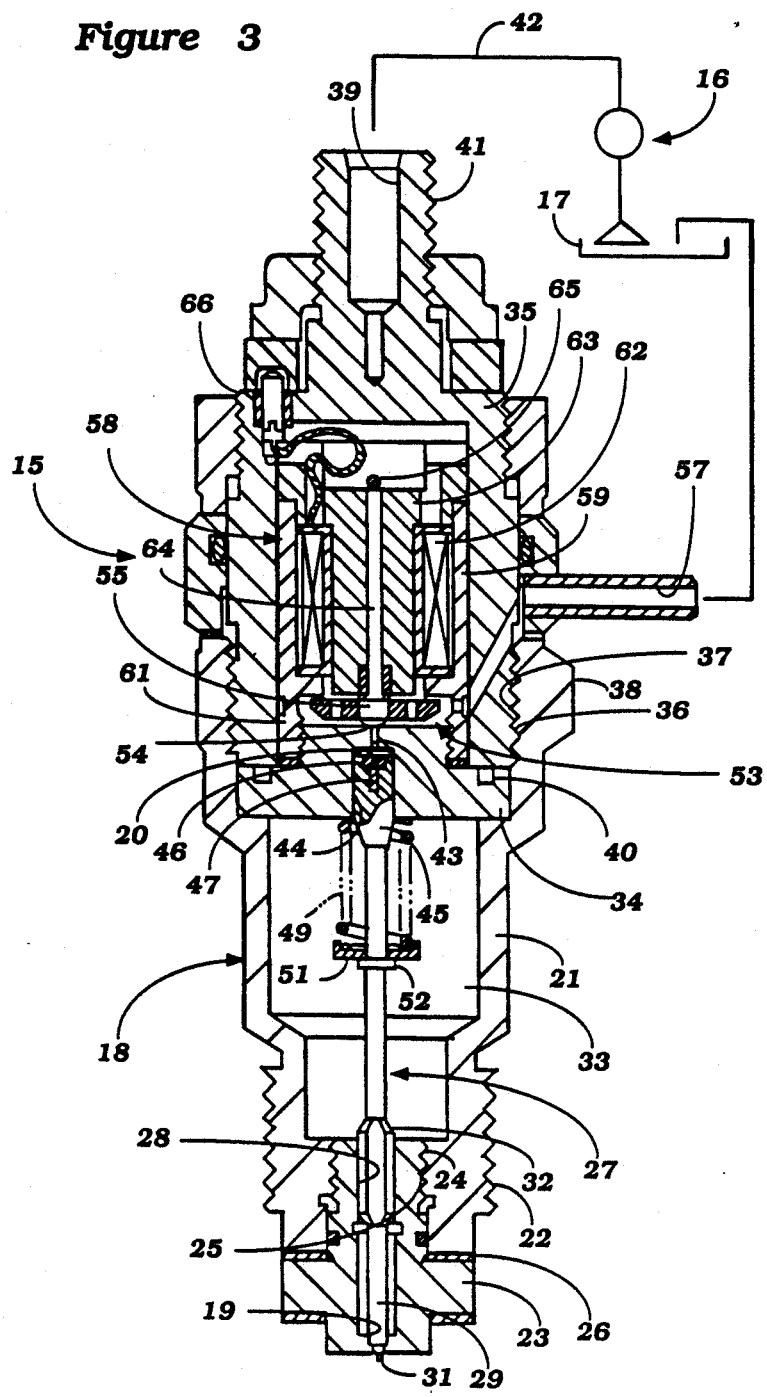
FIG. 3 is an enlarged cross-sectional view showing one of the fuel injection nozzles and related components of the system schematically.

Referring now specifically in detail to FIG. 3, the injection nozzle 15 is comprised of an outer housing assembly, indicated generally by the reference numeral 18 that is adapted to be mounted, as noted, in the cylinder head of an internal combustion engine with a nozzle port 19 communicating with the combustion chamber for delivering fuel to it in a manner to be described. Rather than direct cylinder injection, the invention may be utilized in conjunction with manifold injection systems but the invention has particular utility with direct injection, for example as used with high speed diesel engines.

The outer housing 18 is comprised of a lower piece 21 that has a threaded lower end 22 that is adapted to be threaded into a suitable aperture in the cylinder head of the associated engine 11 in a known manner. The nozzle port 19 is defined by a tip 23 that has a threaded portion 24 that is received in a threaded bore 25 formed at the lower end of the housing piece 21. An adjusting shim 26 is interposed between the nozzle piece 23 and housing 21 for length adjustment.

An injection valve, indicated generally by the reference numeral 27, is slidably supported within a bore 28 of the nozzle piece 23 and has a reduced diameter portion 29 and a flow controlling tip 31 which, in the closed position, closes the injection nozzle port 19. The valve 27 has a portion 32 with interrupted enlargements for slidably supporting the injection valve 27 in the bore 28 in a known manner.

An accumulator chamber 33 is formed above the bore 28 by the housing piece 21. The accumulator chamber 33 is closed at its upper end by means of a closure plate 34 that is held against a shoulder in the housing piece 21 by a second housing piece 35. The housing piece 35 has a threaded portion 36 that is received within a threaded bore 37 of the housing piece 21 so as to hold the closure plate 34 in position and maintain the chamber 33 in a sealed condition, except as is hereinafter noted. Externally of the threaded opening 37, the housing piece 21 is formed with a hexagonal portion 38 so as to facilitate its insertion into the threaded bore of the cylinder head.

The housing piece 35 is formed with an inlet conduit 39 that has a threaded external portion 41 so as to receive a fitting for connecting a supply line 42 extending from the pressure pump 16 to the inlet conduit 39.

The inlet conduit 39, which is generally a drilled opening, is intersected by an angularly disposed passageway and a further drilled passageway that extends axially along the housing piece 35 (neither of which appear in the figures) at one side thereof and which communicates at its lower end with a corresponding circumferential groove 40 formed in the upper face of the closure plate 34. The groove 40 is intersected by a radially extending bore (not shown) which, in turn, has a metered passage (not shown) for delivering fuel under pressure to the accumulator chamber 33.

A control chamber 43 is formed in the closure plate 34 by means of a bore 44 that opens through the lower end of the closure plate 34. The injection valve 27 has a generally cylindrical actuator portion 45 that is slidably supported within the bore 44 and which closes the lower end of the control chamber 43. A restricted orifice 46 fixed in the end of the actuator portion 45 communicates an axial passage 47 of the portion 45 and radial port (not shown) with the inlet passage for the accumulator chamber 33. The control chamber 43 communicates with the orifice 46 to receive the pressurized fluid and normally urge the injection valve 27 toward its downward or closed position.

A coil compression spring 49 encircles the injection valve 27 and bears against the closure plate 34 at its upper end. The lower end of the spring 49 engages a cup shaped retainer 51 that is held axially in position against a shoulder formed by an enlargement 52 on the injection valve 27 so as to further assist in maintaining the injection valve 27 in the closed position as shown in the drawing.

A relief valve, indicated generally by the reference numeral 53, is supported at the upper end of the closure plate 34 and controls the opening of a relief valve seat 54 formed in the upper end of the closure plate 34 and communicating with the control chamber 43. The relief valve 53 comprises a headed portion 55 that is received within a corresponding recess formed in an enlarged disk like armature plate. The relief valve portion 55 is biased toward its closed position with the valve seat 54 in a manner to be described.

The relief valve 53 when opened will permit the fuel in the control chamber 43 to return to the tank 17 through a return fitting 57 that extends radially through the end of the housing 18. The return passageway 57 communicates with a return conduit leading to tank 17. Fuel can flow from the relief valve seat 54 to the return passageway 57 through suitable internal passageways to permit this return flow, which is relatively small in volume.

The relief valve 53 is opened and closed so as to control the discharge of fuel from the nozzle port 19 by means of an electromagnetic assembly, indicated generally by the reference numeral 58. This electromagnetic assembly 58 includes a generally cylindrical yoke 59 that has a threaded opening at a lower end portion 61 which is received on a threaded portion of the closure plate 34 so as to secure the electromagnetic assembly 58 in position.

The electromagnetic assembly 58 is comprised of a solenoid coil or winding 62 that is disposed at the lower end of the housing or yoke 59 and which encircles an armature 63. The armature 63 is formed with a bore that slidably supports an extension 64 of the relief valve portion 55. A round leaf spring 65 extends across the end of the bore and is preloaded by means of an adjustable screw 67 so as to apply a preset closing biasing force on the relief valve 53 so as to hold it in the closed position as aforenoted.

A circuit is provided for energizing the coil 62 of the electromagnet assembly 58 for opening and closing the relief valve 53. This circuit includes a pair of terminal posts 66 (only one of which is shown) that extend through the upper end of the housing piece 35 and cooperate with a timing circuit to be described.

The condition shown in FIG. 3 is that which occurs when the winding 62 is deenergized. When the winding 62 is deenergized the relief valve 53 will be held in its closed position by the spring 65 so that the accumulator chamber 33 and control chamber 43 may be pressurized.

At the appropriate instant for fuel injection to begin, which may be controlled in any suitable strategy, the winding 62 is energized. When this happens, the relief valve armature will be attracted upwardly by the flux in the armature 63 so as to urge the valve portion 64 upwardly and open the relief valve 53 against the action of the spring 65. The pressure in the control chamber 43 will then be rapidly depleted and the higher pressure of the fuel acting in the accumulator chamber 33 will urge the injection valve 27 upwardly and permit fuel to issue from the nozzle port 19. When the fuel pressure in the accumulator chamber 33 has been depleted, the spring 49 will move the injection valve 27 to its closed position and the fuel pressure can then build up in the accumulator chamber 33. This action is initiated by discontinuing the energization of the winding 62 so as to close the relief valve 53 and permit pressure in the control chamber 43 to again build up.

Figure 4:
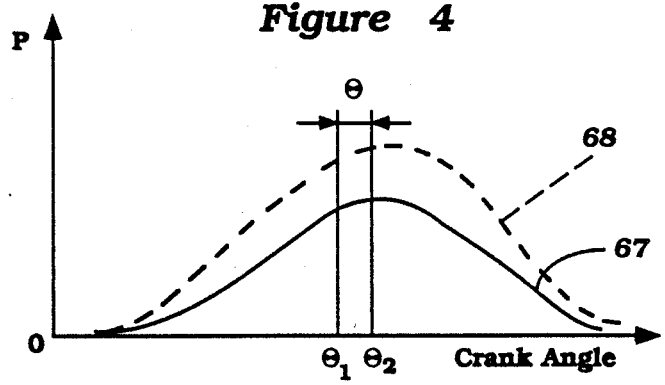
FIG. 4 is a graphical view showing the output pressure of the high pressure pump in relation to output shaft angle.

It should be readily apparent that the amount of fuel that is injected each time the injection valve 27 is opened will depend upon the pressure existing in the accumulator chamber 33 and the time during which the injection valve 27 is opened. FIG. 4 is a graphical view showing how the pressure supplied to the accumulator chamber 33 varies in response to crankshaft angle. In this figure, crankshaft angle is shown on the abscissa and fuel outlet pressure P is shown on the ordinate. There are depicted two pressure curves, the curve 67 which generally indicates the output pressure of the high pressure side of the pump 16 at low speeds and the curve 68 which generally indicates the output pressure at high speeds. It will be seen that the pressure varies slightly, however, this slight pressure variation is not sufficient so as to provide the proper fuel/air ratio, for a reason which will now be described.

Figure 2:
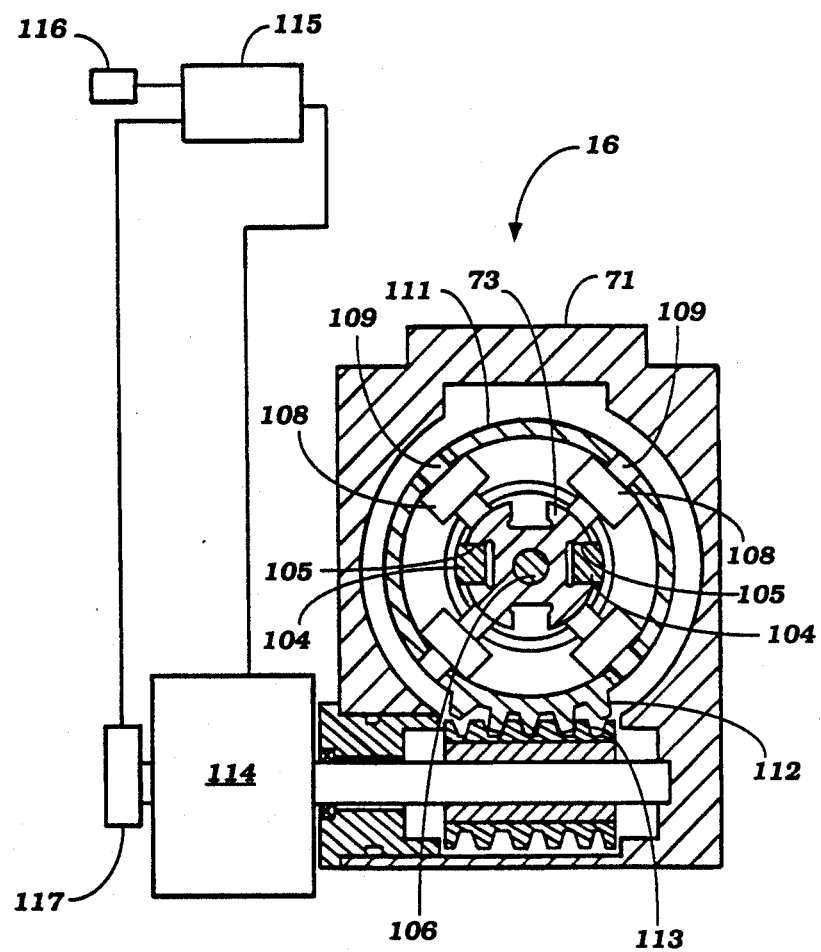
FIG. 2 is a cross-sectional view taken along the line 2—2 of FIG. 1 and further shows certain of the control components in a schematic fashion.
Figure 5:
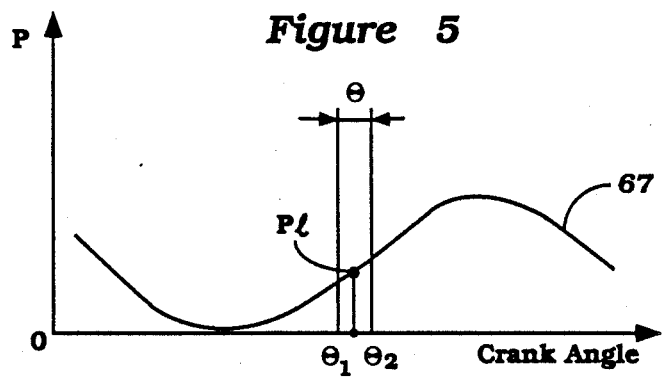
FIG. 5 is a graphical view, in part similar to FIG. 4, showing how the amount of fuel injected at low engine speeds is effected.
Figure 6:
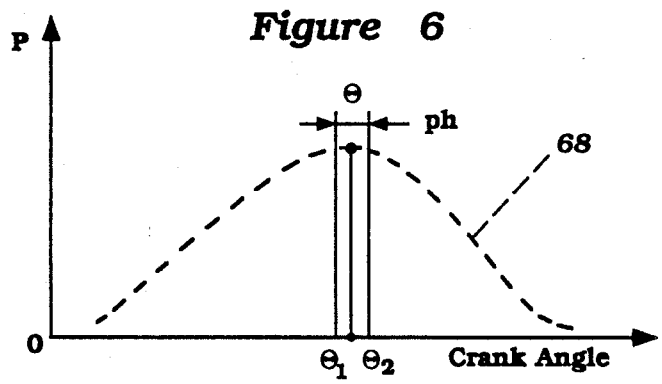
FIG. 6 is a graphical view, in part similar to FIGS. 4 and 5, showing how the amount of fuel injected at high engine speeds is controlled.

Conventionally, the fuel discharge of the nozzle 15 is controlled so that injection will begin at a first crank angle $\theta_1$ and continue to a second crank angle $\theta_2$ for a total crank angle duration of $\theta$. This discharge is normally accomplished sometime prior to the maximum pump discharge. Although the crank angle during which fuel injection is maintained is constant at all speeds, the actual time at which the injection valve 27 is open will decrease as the engine speed increases. As a result, even though the discharge pressure of the high pressure side of the pump 16 may be slightly higher at high speeds, it is impossible to maintain the proper fuel/air ratios under all running conditions with the prior art systems. In accordance with the invention, therefore, there is provided an arrangement for shifting the phase of the curves 67 and 68 depending on running conditions, as shown in FIGS. 5 and 6, so as to provide the desired fuel/air ratio under all conditions. The manner in which this is done will now be described in particular reference to FIGS. 1 and 2, wherein the construction and operation of the fuel injection pump 16 will be described.

The injection pump 16 is comprised of an outer housing made up of a main housing part 71 and a closure plate 72. A drive shaft 73 is rotatably journaled in the main housing part 71 and is driven from the crankshaft 14 through a timing gear arrangement 74 so that the driving shaft 73 will be driven at one half crankshaft speed, assuming that the associated engine 11 is of the four cycle type. If the engine is of the two cycle type, the driving shaft 73 will be driven at crankshaft speed.

The injection pump 16 includes a low pressure side 75 that receives fuel from the fuel tank 17 through an inlet port 76 and which pressurizes it for delivery to a high pressure side 77. The low pressure side 75 is of the trochoidal type and includes a rotor 78 that is supported within a chamber defined by the housing part 71 and a closure plate 79. Suitable discharge ports (not shown) communicate the output of the low pressure pump 75 with a cavity 78 formed in the housing 71 and closed by the closure plate 72.

The high pressure pump 77 includes a plunger 81 for each cylinder of the engine, which plunger is slidably supported within a sleeve 82 carried by the closure plate 72 and which defines a high pressure chamber 83. Fluid enters the chamber 83 from the chamber 78 through a check valve assembly, indicated generally by the reference numeral 84 and which comprises a valve seat 85 that is threaded into a threaded opening formed at the base of a counter bore which is closed by a closure plug 86. This counter bore communicates with the chamber 78 through a passageway 87. A ball type check valve 88 is normally held against the seat 85 by a coil compression spring 89. When the plunger 81 is going through an expansion stroke, the check valve 88 will unseat and fuel may enter the pumping chamber 83.

When the fuel in the chamber 83 is pressurized by the pressure stroke of the plunger 81, the fuel flows into the conduit 42 through a delivery valve, indicated generally by the reference numeral 91. The delivery valve 91 includes a seat 92 that communicates with the pumping chamber 83 and which is formed by an insert 93 that is held in the closure plate 72 by means of a retaining plug 94. A check valve element 95 is normally held against the seat 92 by means of a coil compression spring 96. However, when the chamber 83 is pressurized, the check valve 95 will move away from the seat 92 and permit fuel discharge. The check valve spring 96 is held in place by a plug 97 to while the conduit 42 is connected in a known manner.

Reciprocation of the plunger 81 is accomplished by means of a cam disk 102 that has an inclined cam surface 103 and which is affixed for rotation with the input shaft 73 by means of a tongue and groove connection consisting of lugs 104 formed on the cam disk 102 and which are received within grooves 105 formed in an end of the driving shaft 73. The cam disk 102 further has a cylindrical pilot portion 106 that is received within a central bore of the drive shaft 73 for alignment purposes.

A coil spring arrangement 107 is disposed to one side of the plunger 81 and urges the plunger 81 into engagement with the cam disk 102 and the cam surface 103 into engagement with roller followers 108 that are journaled on cross shafts 109 which are, in turn, carried by a timing cylinder 111. The inclination of the cam face 103 and its cooperation with the rollers 108 is such that there will be a single stroke of the plunger 81 for each rotation of the drive shaft 73. However, the phase of this relationship can be adjusted in the manner now to be described.

The timing cylinder 111 is formed with an external worm wheel gear 112, which may be only a segmental gear, that is enmeshed with a worm 113 that is fixed to the shaft of a drive motor 114. The drive motor 114 is operated by means of a controller 115 that provides a control signal that is responsive to an engine running condition such as engine speed as detected by a detector 116. In addition, the controller 115 receives a signal from a position indicator 117 such as a potentiometer to provide a signal indicative of the position of the worm 113 and, accordingly, of the timing cylinder 111.

FIG. 5 shows the position to which the timing cylinder 111 is rotated under low engine speed conditions. When this occurs, the curve 67 is shifted to the right so that the point $0_1$ occurs at the low pressure side of the stroke of the plunger 81 so as to cause a relatively low output pressure to be exerted. As a result, the amount of fuel injected during the opening of the injection valve 27 will be reduced.

However, as the engine speed increases, the position of the timing cylinder 111 is adjusted so as to shift the high pressure curve 68 toward the left and cause the injection pressure to be at the maximum P. The actual rotational position of the timing cylinder 111 is programmed into the controller 115 and can be as desired for optimum engine performance for a given engine speed.

It should be readily apparent from the foregoing description, therefore, that a highly effective high pressure fuel injection device for an engine has been provided that will insure adequate and proper amounts of fuel discharge at all running conditions even thought the timing of opening of the injection valve 27 is maintained constant in relation to crankshaft angle. Although an embodiment of the invention has been illustrated and described, various changes and modifications may be made without departing from the spirit and scope of the invention, as defined by the appended claims.

We claim:

1. A fuel injection device for use with an accumulator type of injection nozzle comprised of an accumulator chamber adapted to be supplied with high pressure fuel from a pressure source, a nozzle port leading from said accumulator chamber to an engine, an injector valve moveable between a closed position and an opened position for controlling the discharge of fuel from said accumulator chamber through said nozzle port to said engine, a control chamber for receiving pressurized fuel, an actuating member supported for movement within said control chamber and associated with said injector valve for retaining said injector valve in its closed position when said control chamber is pressurized and for movement of said injector valve to its opened position when pressure is relieved in said control chamber, and relief valve means moveable between a closed position for maintaining pressure in said control chamber and an opened position for relieving said control chamber for effecting fuel discharge through said nozzle port, the improvement comprising means for varying the pressure of the fuel delivered to said accumulator chamber from said pressure source in response an engine running condition, said pressure source comprising a reciprocating pump, and said menas for changing the pressure in response to the engine running condition comprising means for changing the phase of the reciprocating pump relative to the phase of the output shaft angle of the engine.

2. A fuel injection device as set forth in claim 1 wherein the means for changing the phase comprises a timing ring driven by a gear and cooperating with a cam for reciprocating the plunger.

3. A fuel injection device as set forth in claim 1 further including means for opening the relief valve means at a given position of the output shaft angle of the engine and for closing the relief valve at a predetermined output shaft angle rotation after its opening.

4. A fuel injection device as set forth in claim 3 wherein the running speed of the engine comprises its output shaft speed.

5. A fuel injection device as set forth in claim 4 wherein the means for changing the phase comprises a timing ring driven by a gear and cooperating with a cam for reciprocating the plunger.

* * * * *